United States Patent Office 2,899,082
Patented Aug. 11, 1959

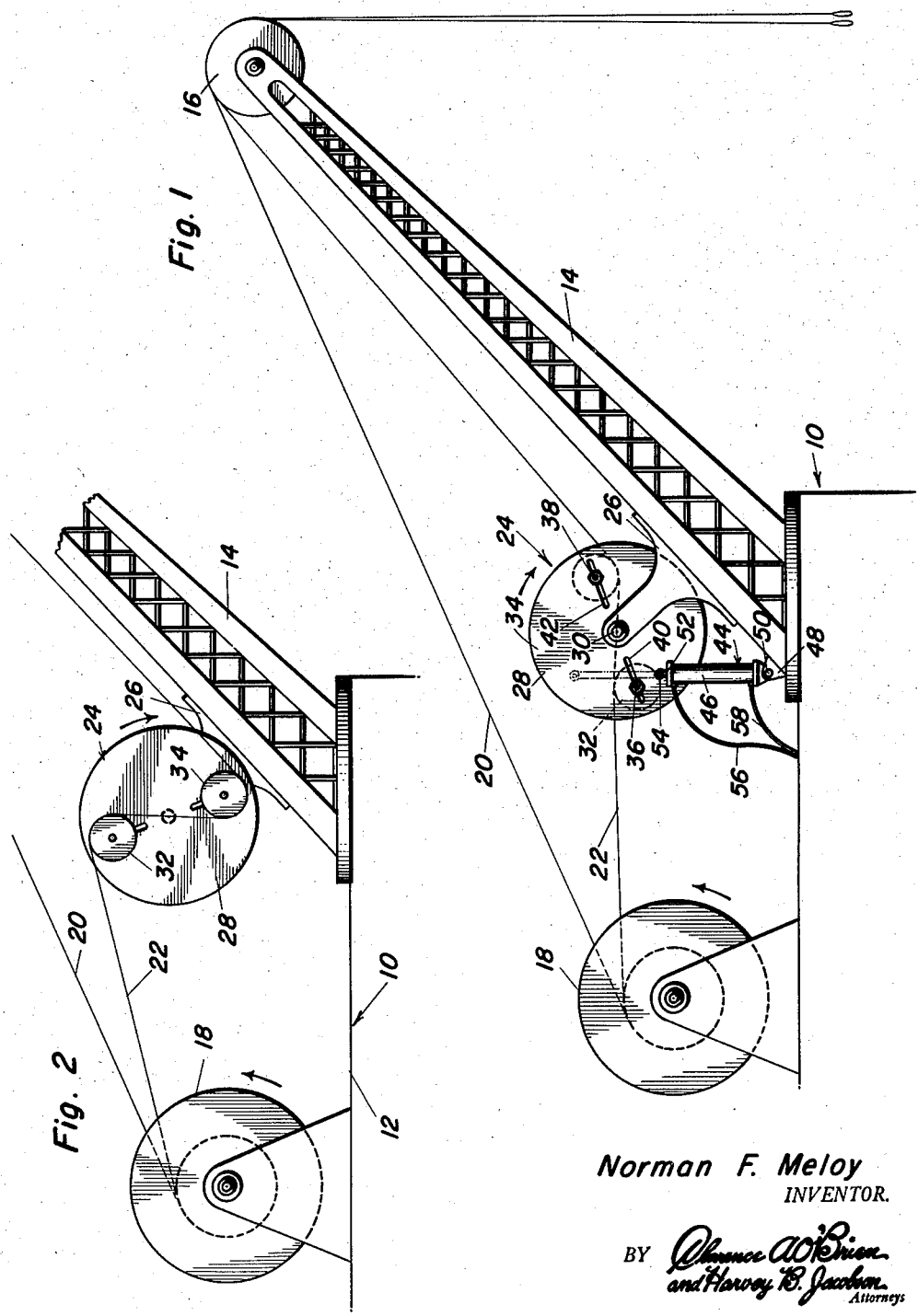

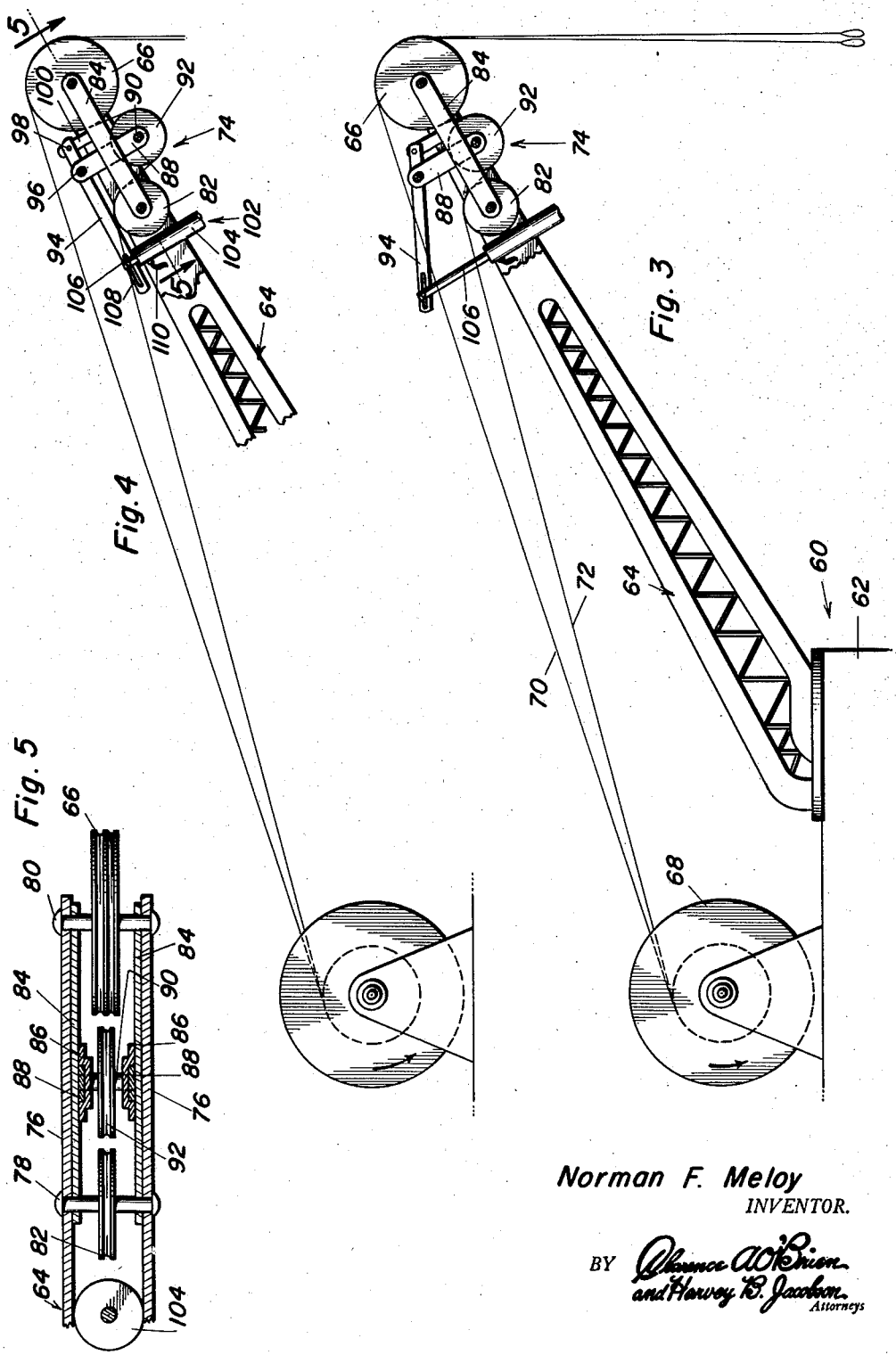

2,899,082

POWER LINE ATTACHMENT FOR SHOVELS

Norman F. Meloy, Naches, Wash.

Application August 28, 1956, Serial No. 606,650

5 Claims. (Cl. 212—42)

This invention relates in general to new and useful improvements in earth working equipment, and more particularly to a power line attachment for shovels.

In the operation of tongs and certain other types of attachments for shovels it is necessary that there be provided both a load line and a trip line. Normally each of these lines requires a separate drum inasmuch as they must be independently operated. In certain instances, the shovel may be so rigged whereby there is not provided an extra drum for the trip line and in order to utilize the trip line, the shovel must be partly unrigged. Further, when there is provided an extra drum for the trip line, it is necessary that the operator of the shovel manipulate levers and brakes for controlling both the trip line and the load line drum simultaneously. If the trip line is accidentally tensioned when it is not desired, then the tongs or other attachment is tripped accidentally. In many instances this is highly undesirable and do cause accidents.

It is therefore the primary object of this invention to provide a power attachment for shovels which is of such a nature whereby both a load line and a trip line may be mounted on a single drum and the trip line selectively tensioned when desired by using the power attachment.

Another object of this invention is to provide a power attachment for shovels which may be mounted on the boom of the shovel and which is engaged with the trip line, the power attachment normally permitting the trip line to remain slack and to be free running with the load line, the power attachment being selectively actuated to tension the trip line independently of the load line whereby a shovel attachment carried by the load line may be selectively tripped.

A further object of this invention is to provide an improved power attachment for trip lines and shovels, the power attachment being of such a nature whereby it may be mounted on booms of existing shovels and includes simply a pair of pulleys over which the trip line is entrained, the pulleys including at least one movable pulley whereby movement of the movable pulley will result in the increasing of the distance over which the trip line must travel thus tensioning the trip line.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a schematic side elevational view of a shovel and shows mounted on the boom of the shovel a power attachment which is engaged with the trip line of the shovel for selectively tensioning the trip line;

Figure 2 is a fragmentary side elevational view similar to Figure 1 with the power attachment having a portion thereof broken away and shown in section in order to illustrate the arrangement of pulleys thereof, the power attachment being in an operative position for tensioning the trip line;

Figure 3 is a schematic side elevational view of another shovel, the shovel being similar to the shovel of Figure 1 and having mounted on the boom thereof a modified form of power attachment, a portion of the boom being broken away in order to illustrate the details of the power attachment;

Figure 4 is a view similar to Figure 3 with the power attachment being shown in an operative position for tensioning the trip line; and Figure 5 is an enlarged fragmentary sectional view taken substantially upon the plane indicated by the section line 5—5 of Figure 4 shows the relationship of the various components of the power attachment and the relationship thereof with respect to side plates of the boom.

Referring now to Figures 1 and 2 in particular, it will be seen that there is illustrated a preferred form of the invention mounted on a shovel which is referred to in general by the reference numeral 10. The shovel 10 is only schematically shown and includes a base 12 which has extending forwardly from the forward part thereof an elongated boom 14. The boom 14 is provided at the upper end thereof with a double sheave 16. The shovel 10 also includes a drum 18.

It is to be understood that the shovel 10 will be of the conventional type and that there will be provided suitable means for controlling the position of the boom 14. Also, in addition to the drum 18 the shovel 10 will be provided with additional drums. The drum 18 as well as the additional drums will be provided with suitable control levers for controlling the driving of the drums as well as suitable pedals for controlling brakes of the drum.

Normally only one cable is reeled on a drum. Thus two drums are required for a load line and a trip line. However, with the present invention both a load line 20 and a trip line 22 are reeled on the single drum 18. The load line 20 and the trip line 22 are entrained over the sheave 16 and depend therefrom for attachment to tongs or other attachments for shovels which require both a load line and a trip line.

In order that the tongues or other attachment for the shovel 10 may be operated and tripped when desired, there is provided a power attachment for the trip line 22, the power attachment being referred to in general by the reference numeral 24.

The power attachment 24 includes transversely spaced mounting brackets 26 carried by the upper surface of the lower part of the boom 14. Disposed between the mounting brackets 26 is a pair of transversely spaced plates 28. The plates 28 are circular in outline and are connected to the individual mounting bracket 26 by means of spindles 30. Disposed between the plates 28 are pulleys 32 and 34, the pulleys 32 to be considered a first pulley and the pulley 34 to be considered a second pulley. The pulleys 32 and 34 include shafts 36 and 38, respectively, on which they are rotatably journaled. The pulleys 32 and 34 are adjustably mounted with respect to the plates 28 by the provision of the elongated slots 40 and 42 which adjustably receive the shafts 36 and 38, respectively.

Mounted on the lower part of the boom 13 is an extensible hydraulic motor which is referred to in general by the reference numeral 44. The hydraulic motor 44 is of the double acting type and includes a cylinder 46 which has the lower end thereof connected to the boom by means of a mounting bracket 48 and a transverse pivot pin 50. The hydraulic motor 44 also includes an extensible piston rod 52 which is connected to one of the plates 28 by means of a pin 54.

The cylinder 46 of the hydraulic motor 44 has attached to opposite ends thereof lines 56 and 58. The lines 56 and 58 will be connected to the hydraulic system, not shown, of the shovel 10 and operation of the hydraulic motor 44 will be controlled by a simple valve which may be positioned conveniently adjacent the operator of the shovel 10.

Normally the trip line 22 is loosely entrained over the pulley 32 and under the pulley 34 before passing over the sheave 16. During the normal operation of the shovel 10, the load line 20 supports the attachment (not shown) to which the load line 20 and the trip line 22 are connected. The trip line 22 remains slack most of the time except when required to trip the attachment. In order that the trip line 22 may be tensioned independently of the load line 20, it is merely necessary for the operator of the shovel 10 to control the operation of the fluid motor 44. As is best illustrated in Figure 2, when the fluid motor 44 is extended the plates 28 are rotated so as to change the relative positions of the pulleys 32 and 34. This results in the absorption of the slack normally found in the trip line 22 and the tensioning thereof so as to trip the attachment carried by the load line 20. Since the hydraulic motor 44 is of the double acting type, the trip line 22 may be immediately slacked upon the returning of the hydraulic motor 44 to its position of Figure 1. It is pointed out that when the trip line 22 is tensioned, the trip line 22 as well as the load line 20 may be reeled or unreeled from the drum 18 without changing the tripping action of the trip line 22.

Referring now to Figures 3, 4 and 5 in particular, it will be seen that there is illustrated a modified form of power attachment which is mounted on a shovel referred to by the reference numeral 60. The shovel 60, like the shovel 10, is only schematically shown and includes a base 62, which has extending upwardly and forwardly therefrom a boom 64. The upper end of the boom 64 is provided with a double sheave 66. Mounted on the base 62 is at least one drum 68 which has reeled thereon both a load line 70 and a trip line 72. The load line 70 and the trip line 72 are entrained over the sheave 66 and depend therefrom for attachment to a suitable attachment or accessory for the shovel 60 which requires both a load line and a trip line.

In order that the trip line 72 may normally be slacked and independently tensioned separately of the load line 70, there is provided a power attachment which is referred to in general by the reference numeral 74. The power attachment 74 is carried by the outer part of the boom 64 immediately adjacent the sheave 66.

As is best illustrated in Figure 5, the boom 64 includes a pair of side plates 76. The side plates 76 have extending therebetween shafts 78 and 80 on which there are rotatably journaled a first pulley 82 and the double sheave 66, respectively. Disposed within the confines of the boom 64 in face to face engagement with the side plates 76 thereof is a pair of elongated supports 84. The supports 84 are held in position by the shaft 78.

Carried by the supports 84 intermediate the shafts 78 and 80 are transverse guides 86. The guides 86 have guidingly disposed therein support bars 88 which are disposed normal to the longitudinal axis of the boom 64 and which project above and below the boom 64, as is best illustrated in Figure 4. Extending between the lower ends of the bars 88 is a shaft 90 on which a second pulley 92 is journaled, the pulley 92 being disposed in alignment with the pulley 82 but with the shaft 90 normally disposed below the plane passing through the shafts 78 and 80.

The support bars 88 have their upper ends connected to an intermediate portion of the longitudinally extending lever 94 by means of a pin 96. The forward end of the lever 94 is connected by means of a pin 98 to a bracket 100 carried by the boom 64. The rear end of the lever 94 is disposed rearwardly of the first pulley 82 and has connected thereto a hydraulic motor 102. The hydraulic motor 102 includes a cylinder 104 which is fixedly carried by the boom 64. The hydraulic motor 104 also includes an extensible piston rod 106 which is connected to the lever 94 by a lost motion connection including a slot 108 in the lever 94. Connected to the opposite ends of the cylinder 104 are hydraulic lines 110 which run to the main part of the shovel 60 and which are connected to the hydraulic system (not shown) of the shovel 60. The hydraulic lines 110 will have the flow of hydraulic fluid therethrough controlled by a valve (not shown) which will be mounted on the shovel 60 adjacent the operator thereof.

The trip line 72 is normally in a slacked relation and is entrained over the pulleys 82 and 92 in the position illustrated in Figure 3. At this time the piston rod 106 is in extended position with the second pulley 92 being elevated. With the trip line 72 in a slacked state, the load line 70 carries all of the weight of the attachment (not shown) secured to the load line 70 and the trip line 72. However, when it is desired to trip the attachment, the trip line 72 is tensioned independently of the load line 70 by the power attachment 74. This is accomplished by retracting the piston rod 106 which results in the downward pivoting of the lever 94 which in turn results in the downward movement of the second pulley 92. As the pulley 92 moves downwardly, the distance which the trip line 72 must travel intermediate the drum 68 and the sheave 66 is increased so as to tension the trip line 72 the desired amount to trip the attachment (not shown) carried by the load line 70.

From the foregoing description of the two forms of the present invention, it will be readily apparent that both forms may be easily mounted upon booms of existing shovels and the trip line of such shovels rigged thereover so that both the load line and the trip line may be reeled on a single drum for simultaneous operation. This prevents the accidental tensioning of the trip line due to the unequal paying out of the load line and the trip line from separate drums. Also, this makes it possible to utilize a shovel at all times, no matter how rigged, for the purpose of operating an attachment which requires a trip line. Further, inasmuch as the attachment is operated by a simple lever for positioning a control valve, it will be readily apparent that the operation of a shovel employing the power attachments, which are the subject of this invention, is greatly simplified.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a shovel construction, a boom having an outer end, a double sheave carried by said outer end of said boom, a drum, a load line and a trip line carried by said drum, said load line and said trip line being entrained over said sheave, a power attachment for actuating said trip line independently of said load line, said power attachment including a first pulley carried by said boom intermediate said drum and said sheave, a second pulley, means mounting said second pulley adjacent said first pulley for relative movement, said trip line being entrained over said first and second pulleys, and remotely controllable power means connected to said second pulley for shifting said second pulley to tension said trip line, said second pulley being disposed intermediate said first pulley and said sheave.

2. In a shovel construction, a boom having an outer end, a double sheave carried by said outer end of said boom, a drum, a load line and a trip line carried by said drum, said load line and said trip line being entrained over said sheave, a power attachment for actuating said trip line independently of said load line, said power attachment including a first pulley carried by said boom intermediate said drum and said sheave, a second pulley, means mounting said second pulley adjacent said first pulley for relative movement, said trip line being entrained over said first and second pulleys, and remotely controllable power means connected to said second pulley for shifting said second pulley to tension said trip line, said second pulley being disposed intermediate said first pulley and said sheave, said power means being in the form of an extensible fluid motor secured to said boom.

3. In a shovel construction, a boom having an outer end, a double sheave carried by said outer end of said boom, a drum, a load line and a trip line carried by said drum, said load line and said trip line being entrained over said sheave, a power attachment for actuating said trip line independently of said load line, said power attachment including a first pulley carried by said boom intermediate said drum and said sheave, a second pulley, a mounting plate extending longitudinally of said boom, said mounting plate having a central pivot, said first and second pulleys being carried by said mounting plate on opposite sides of said pivot for rotation with said mounting plate, said trip line being entrained over said first and second pulleys, and remotely controllable power means connected to said mounting plate for rotating said mounting plate and said first and second pulleys to tension said trip line.

4. In a shovel construction, a boom having an outer end, a double sheave carried by said outer end of said boom, a drum, a load line and a trip line carried by said drum, said load line and said trip line being entrained over said sheave, a power attachment for actuating said trip line independently of said load line, said power attachment including a first pulley carried by said boom intermediate said drum and said sheave, a second pulley, said first and second pulleys being disposed generally within said boom adjacent each other and said sheave, means mounting said second pulley adjacent said first pulley for relative movement, said trip line being entrained over said first and second pulleys, and remotely controllable power means connected to said second pulley for shifting said second pulley to tension said trip line.

5. In a shovel construction, a boom having an outer end, a double sheave carried by said outer end of said boom, a drum, a load line and a trip line carried by said drum, said load line and said trip line being entrained over said sheave, a power attachment for actuating said trip line independently of said load line, said power attachment including a first pulley carried by said boom intermediate said drum and said sheave, a second pulley, said first and second pulleys being disposed generally within said boom adjacent each other and said sheave, means mounting said second pulley adjacent said first pulley for relative movement, said trip line being entrained over said first and second pulleys, and remotely controllable power means connected to said second pulley for shifting said second pulley to tension said trip line, said second pulley being disposed intermediate said first pulley and said sheave.

References Cited in the file of this patent

UNITED STATES PATENTS

| | | |
|---|---|---|
| 829,833 | Bergeron | Aug. 28, 1906 |
| 832,744 | Norris | Oct. 9, 1906 |
| 1,524,100 | Mullin | Jan. 27, 1925 |

FOREIGN PATENTS

| | | |
|---|---|---|
| 407,954 | Great Britain | Mar. 23, 1934 |